United States Patent
Hiers et al.

[11] Patent Number: 6,092,622
[45] Date of Patent: Jul. 25, 2000

[54] THERMAL AND ACOUSTICAL INSULATING SHIELD

[75] Inventors: John J. Hiers, Elkin; Timothy L. Byrd, Boonville, both of N.C.

[73] Assignee: Lydall, Inc., Manchester, Conn.

[21] Appl. No.: 09/033,852

[22] Filed: Mar. 3, 1998

[51] Int. Cl.[7] .................................................. E04B 1/82
[52] U.S. Cl. .......................... 181/290; 181/208; 442/388
[58] Field of Search ................................... 181/290, 294, 181/291, 295, 296, 207, 208; 442/388; 428/94, 95, 97

[56] References Cited

U.S. PATENT DOCUMENTS

| | | | |
|---|---|---|---|
| 1,823,405 | 9/1931 | Mazer | 181/290 |
| 3,975,565 | 8/1976 | Kendall . | |
| 4,199,635 | 4/1980 | Parker | 428/95 |
| 4,237,180 | 12/1980 | Jaskowski . | |
| 4,389,442 | 6/1983 | Pickens, Jr. et al. | 428/94 |
| 4,522,876 | 6/1985 | Hiers . | |
| 4,851,274 | 7/1989 | D'Elia . | |
| 4,996,095 | 2/1991 | Behdorf et al. . | |

*Primary Examiner*—Khanh Dang
*Attorney, Agent, or Firm*—Griffin, Butler, Whisenhunt & Szipl, LLP

[57] ABSTRACT

A flexible, adhesively attachable, thermal and acoustical insulating shield has a needled, flexible, fibrous batt (40) having an insulating layer (43) of insulating fibers (44) disposed between opposite binding layers (41, 42) of binding fibers (45). Binding fibers (45) of each binding layer (41, 42) are needledly disposed through the insulating layer (43) and an opposite binding layer (41, 42) to provide tufts (46) of binding fibers (45) protruding from the opposite binding layer (41, 42) so as to form a tufted upper surface (47) and a tufted lower surface (48) of the batt (40). A flexible adhesive (50) is disposed and adhered substantially over the upper surface (47) and lower surface (48) of the batt (40) such that the tufts (46) on the upper and lower surfaces (47, 48) are secured to the surfaces by the adhesive. A flexible, protective foil (51) is permanently adhered by the adhesive (50) to the lower surface (48) of the batt. The shield may be flexed and pressed to configure and permanently attach the upper surface (47) to an object (1) to be shielded.

44 Claims, 3 Drawing Sheets

THERMAL AND ACOUSTICAL INSULATING SHIELD

The present invention relates to a thermal and acoustical insulating shield and more particularly to such shield which is adhesively attached to an object to be protected.

BACKGROUND OF THE INVENTION

Thermal and acoustical insulating shields have long been known in the art. Such shields are used in a wide variety of applications, among which are shielding in space crafts, automobiles, home appliances, electronic components, industrial engines, boiler plants and the like. Some of such shields have proportionally smaller thermal insulating value and proportionally higher acoustical insulating value, and vice versa. There are, of course, shields which lie therebetween.

In connection with the thermal insulating value, shields are known which provide thermal insulation, primarily, by virtue of being a radiation thermal shield, while others provide thermal insulation by being, primarily, a conduction thermal shield, and, again, there are shields that lie therebetween. For example, pressed and formed sheet metal has long since been mounted by bolts, nuts, screws, welding, etc. between an object to be protected, i.e. shielded, for example, the floor pan of an automobile, and a heat source, for example, a portion of the exhaust system. Such a formed sheet metal provides thermal insulation, primarily, by re-radiation of heat from the portion of the exhaust system back into the ambient and/or other cooler parts of the undercarriage of an automobile to thermally insulate the floor pan from that portion of the exhaust. Such sheet metal shields, however, have low acoustical insulating value, and a large portion of noise produced in an adjacent portion of an exhaust system can be transmitted through the floor pan of the automobile and into the passenger compartment. Additional noise can be produced by loose shields which vibrate and/or rattle. Such sheet metal shields, also, provides thermal insulation value in connection with conductive heat, since such sheet metal shields will be spaced between the floor pan and the portion of the exhaust, and that spacing provides an air gap between the shield and the floor pan which reduces conductive, and to some extent, convective heat transfer.

Where substantial acoustical shielding is also required, metal shields, as described above, are not satisfactory. In such requirements, the shields generally are at least in part fibrous in nature, e.g. batts of fiberglass, which provide increased acoustical insulation as well as good conduction thermal insulation. However, such insulation can only be used where there are insignificant forces, both static and dynamic, on the fibrous insulation, since batts of fiberglass, for example, have very little strength in any direction, i.e. in either the X, Y or Z directions. Such shields are, however, very useful in certain applications, for example, thermal insulation in domestic dishwashers.

A very particular problem in regard to such shields has been encountered by the automobile industry and like industries, and that problem has become acute in recent years. As the overall size of automobiles continues to shrink, space within any portion of the assembled automobile is now at a premium. For example, in past designs of automobiles, sufficient room existed between the exhaust system of the automobile and the floor tunnel of the automobile that the usual sheet metal shield could be suspended in the tunnel, e.g. with bolts, screws, welding and the like, with specially provided ears or dogs or connectors, so as to space that sheet metal shield from the tunnel and from the exhaust system. This provided a radiation barrier to heat transfer from the exhaust system to the tunnel, as well as a conductive and convective heat transfer barrier in view of the spacing between the shield and the tunnel. This design also provided some acoustical insulation. However, with modern designs, the spacing between the exhaust system and the tunnel is now very much reduced, and in many situations, it is now no longer practical to suspend shields between the exhaust and tunnel, and, moreover, the reduced spacing correspondingly reduces any air gap remaining between the shield and the tunnel, such that very little conductive and convective heat insulation or acoustical insulation results.

As a result of the foregoing difficulty in modern designs, automobile manufacturers have increased the thickness of the material making up the floor covering inside the passenger compartment, i.e. the insulation between the carpet and the floor pan (usually "shoddy" material), so as to decrease the heat transfer from the exhaust system into the passenger compartment. This approach, however, is quite expensive, is fairly labor intensive, and, moreover, still is not satisfactory, in that a passenger, especially where the foot rests, can feel the increased temperature and detect the increased noise. Further, this approach does not shield the exterior of the floor pan, and at higher temperatures of that exterior, the coating thereon will blister and corrosion results.

The art has long recognized that fibrous batts, usually containing inorganic fibers, such as glass fibers, mineral and clay wool fibers, alumina-silicate fibers, silica fibers and the like provide very good thermal and acoustical insulation and could potentially be a replacement for the suspended sheet metal shields. The problem with such insulation is that the batts, especially of such inorganic fibers, are usually made by air laying fibers onto a moving belt, and, hence, the fibers tend to stratify in non-discrete layers throughout the thickness (Z direction) of the batts. Since these fibers are not substantially interlocked in the Z direction, the batt has very low Z-directional tensile strength. Even under static loading of its own weight, for example, a batt of fiberglass will simply sag out of its original configuration when suspended from an upper surface thereof. The art has, therefore, expended substantial effort in attempting to provide greater tensile strength to such fibrous batts, in regard to both the X and Y directions and the Z direction.

An early attempt in this regard is disclosed in U.S. Pat. No. 3,975,565 to Kendall, which proposes a composite structure of layered inorganic fibers and organic fibers which are needled together to provide insulating batts (both thermal and acoustical) which have greater tensile strengths in all directions, especially in the Z direction. In this approach, an inorganic fiber layer, such as that of glass fibers, is sandwiched between two layers of organic fibers, for example, cellulose acetate fibers, and needling of the composite sandwiched layers is achieved from either one or both sides of the composite so as to drive portions of the organic fibers from the organic fiber layer(s) through the inorganic fiber layer (glass fibers) and, thus, to tack the composite together and, particularly, improve the Z-directional strength. However, because of the needling technique used in that process, the needle punch density could not be greater than about 260 needle punches per square inch, since, at above about 260 needle punches per square inch, glass fiber damage resulted and with a more than 25% loss of mat strength. While such an approach certainly improved Z-directional strength, with such low numbers of needle punches, the Z-directional strength of such a composite is still quite low and unacceptable for most modern thermal/acoustical insulating applications where substantial static and dynamic forces are placed on that insulation, e.g. in the suspended use with an automobile, as discussed above.

In U.S. Pat. No. 4,237,180 to Jaskowski, it is proposed to improve such composite thermal and acoustical insulating batts by including in the inorganic fiber layers heat shrinkable organic fibers. After needling, the composite batt is subjected to temperatures sufficient to cause the organic fibers to shrink, e.g. at least 40% in length, whereby the shrinking fibers mechanically interlock the inorganic fibers into a more consolidated form and therefor improves the strength, particularly in the Z direction. However, shrinking fibers is not only a difficult process, but is substantially uncontrollable, and this approach does not result in uniform products. Moreover, the tensile strengths, and particularly the Z-directional tensile strengths, are not greatly improved by that process.

U.S. Pat. No. 4,522,876 to Hiers recognizes the problems noted above and specifically addresses the problem of a low number of needle punches described in the Kendall patent and the undesired results thereof. The Hiers patent takes a different approach in that it achieves high numbers of needle punches per square inch by the technique of ensuring that the barbs of needles passing through an organic fiber outer layer(s) are loaded with the organic fibers of that layer(s) before the barbs reach the adjacent glass fiber layer. Since the barbs are filled with organic fibers, the barbs cannot engage and break the glass fibers as the needles pass through the glass fiber layer, and the resulting batt can be highly needled with exceptional Z-directional strength, as well as greatly improved X- and Y-directional strength. While this approach is a very decided advance in the art, it still encounters difficulties when such batts experience high static and dynamic loadings, such as in the case of an automobile with a suspended shield, as described above. These difficulties will be more clear hereinafter.

A somewhat different approach in the art is described in U.S. Pat. No. 4,851,274 to D'Elia. In that approach, onto a needlable substrate is placed a middle layer of mineral fibers of short lengths such as to preclude interlocking of other fibers of the structure. A top layer of organic fibers is placed thereon. Needling is then achieved through that top layer and middle layer to the substrate with needle punches up to about 3,000 per square inch. Since the inorganic fibers are not substantially interlocked, the web becomes quite flexible and a binder can be applied to that structure, such as a phenolic binder, and set for forming a moldable thermal and acoustical shield useful, for example, as trunk liners. However, the use of a synthetic resin to achieve formability of such a shield is a decided disadvantage, since it is quite expensive to use a binder, and, moreover, the shield must be molded with conventional tools and dies, which themselves are quite expensive.

U.S. Pat. No. 4,996,095 to Behdorf et al attempts to solve the problem by yet a further approach. In that patent, it is proposed that a glass fiber mat be bonded to a sheet of aluminum by an adhesive of a particular nature and that the adhesive-joined composite can be used as a shield between an automobile floorboard and an exhaust system. The composite of the aluminum sheet and glass fiber mat is shaped to the contours of the vehicle by conventional processes, such as deep drawing, combined deep drawing-stretching forming, bending and crimping. The so-formed shield is then applied to the vehicle by a special clamp. While this approach provides a good thermal and acoustical insulation, it still requires conventional forming techniques, as noted above, to configure the shield to the object to be protected and also requires special clamps for affixing the shield to the vehicle. All of this is expensive and time consuming in assembly of the automobile and does not solve the problem or severely limited space in modern designs, as noted above.

As can be appreciated from the above, it would be of particular advantage in the art to provide a thermal and acoustical insulating shield which is flexible, so that it may be manually applied to the vehicle contours, or other structure, without having to be preformed in conventional shaping processes, and which shield is adhesively attachable to the object to be protected and without the need of any mechanical attaching devices, such as clamps, bolts, screws, welds and the like.

SUMMARY OF THE INVENTION

The present invention provides such a flexible, adhesively attachable thermal and acoustical insulating shield, and the invention is based on several primary and subsidiary discoveries.

Firstly, it was found that the needling technique of U.S. Pat. No. 4,522,876, described above, could be modified such that, in needling organic fibers from the organic fiber layers sandwiching the inorganic fiber layer, tufts of the organic fibers can protrude from opposite outer sides of the organic fiber layers so as to form a tufted upper surface and a tufted lower surface of the needled batt.

As another primary discovery, it was found that an adhesive could, therefore, be applied to the tufted upper surface and tufted lower surface of the batt, such that the tufts on the upper and lower surfaces are secured to those surfaces by the adhesive. This prevents the tufts from being pulled from that surface during high static or dynamic loading of the shield, as would be encountered by use in an automobile, and, thus, provide very high Z-directional strength to that composite batt.

As another primary discovery, it was found that when an adhesive is used on the lower surface of the batt, then a flexible protective foil may be permanently adhered by the adhesive to the lower surface of the batt. This provides a lower protective surface to the composite batt to prevent mechanical damage, e.g. from rocks and other debris on the road, while at the same time providing radiation insulation to the shield.

As a further primary discovery, it was found that where the adhesive on the upper surface of the batt is an activatable adhesive, such as a pressure-sensitive adhesive, a flexible, strippable foil could be releasably adhered to a pressure-sensitive adhesive on the upper side of the batt, such that, by removing the strippable foil, the shield may be merely flexed and pressed to configure and permanently attach the upper surface of the shield to the object to be shielded. Thus, no forming apparatus or attachment means, such as clamps, bolts, screws, welds and the like, are required to permanently configure and place the shield onto the vehicle, e.g. underneath the floor pan to protect the floor pan from exhaust components.

As a further subsidiary discovery, it was found that if the batt of composite organic and inorganic fibers is of certain thicknesses and the protective foil is of certain materials and certain thicknesses, the shield can be easily manually deformed by a worker when placing the shield next to the contours of the object to be protected, and, accordingly, no preforming, such as conventional stamping, drawing, etc., is required, although such preforming can be practiced if desired.

As another primary discovery, since the shield is adhesively attached directly to the object to be protected, there need be no clearance between the object to be protected, e.g. the floor pan, and the shield itself, which allows the use of the present shield in the very restricted and diminished spaces of modern automobile designs. However, with the combination of the protective foil, particularly when that foil is a radiation barrier foil, and the composite batt, high thermal insulation and high acoustical insulation results.

As a subsidiary discovery, it was found that when pressing the protective foil and/or the strippable foil to the adhesive covered upper and lower surfaces and when pressing the shield to the contours of the object, the tufts on the surface, embraced by the adhesive, tend to bend and compress from the vertical, further locking those tufts into the surfaces of the batt. This provides even greater strength to the batt in the Z direction, because the bent or compressed tufts, somewhat like bradding, become very difficult to separate from the surfaces of the batt and, thus, hold that batt in the Z direction with great strengths, and which strengths can avoid separations of the batt during high static and dynamic loadings on the batt.

Briefly stated, the present invention provides a flexible, adhesively attachable, thermal and acoustical insulating shield. The shield has a needled, flexible, fibrous batt having an insulating layer of insulating fibers disposed between opposite binding layers of binding fibers. Binding fibers of each binder layer are needledly disposed through the insulating layer and an opposite binding layer to provide tufts of binding fibers protruding from that opposite binding layer. This forms a tufted upper surface and a tufted lower surface of the batt. An adhesive is disposed and adhered substantially over the upper surface and the lower surface of the batt such that the tufts on the upper and lower surfaces are secured to those surfaces by the adhesive. A flexible, protective foil is permanently adhered by the adhesive to the lower surface of the batt.

The shield may be flexed and pressed to configure and permanently attach the upper surface to an object to be shielded.

The invention also provides a method for producing such a flexible, adhesively attachable, thermal and acoustical insulating shield. In the method, a flexible, fibrous batt is formed having an insulating layer of insulating fibers disposed between opposite binding layers of binding fibers. The batt is needled such that binding fibers of each binding layer are needled through the insulating layer and opposite binding layer to provide tufts of binding fibers protruding from the surface of the opposite binding layer. This provides a tufted upper surface and a tufted lower surface of the batt. A flexible adhesive is applied and adhered over substantially the upper surface and the lower surface of the batt such that the tufts on the upper and lower surfaces are secured to the surfaces by the adhesive. A flexible, protective foil is applied and permanently adhered by the adhesive to the lower surface of the batt.

Thus, the shield may be flexed and pressed to configure and permanently attach the upper surface to an object to be shielded.

The invention also provides a method of applying the shield of the invention to an object to be thermally and acoustically protected. In this method, the upper surface of the batt, with the adhesive exposed thereon, is pressed at the protective foil sufficiently to configure the shield to the contours of the object to be protected, and the pressure-sensitive adhesive is caused to permanently adhere to the contours of that object. Thus, by this method, the shield can be placed directly and permanently on the object to be protected and without the need of any attachment devices, such as bolts, screws, welds, clamps and the like.

DESCRIPTION OF PREFERRED EMBODIMENTS

Figure 1:
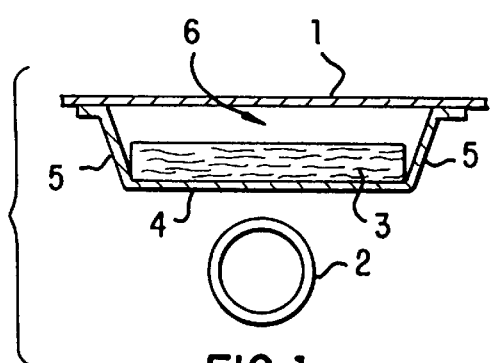
FIG. 1 is a diagrammatic illustration of prior art shields.

Shields of the present nature were provided with an air gap between the shield and the object to be protected, and those shields were generally hung (suspended) from that object by clamps, bolts, screws, welds, and the like. FIG. 1 illustrates such prior art, e.g. such as the device of the Behdorf et al patent described above. As can be seen from FIG. 1, an object to be protected 1 could be, for example, the floor pan of an automobile. The heat source 2 could, for example, be part of an exhaust system of an automobile. As shown in FIG. 1, the shield 3 (usually a fibrous insulation batt) is held by a support 4 and spaced from object 1 by brackets or clamps, etc., 5 so that an air gap, generally, 6 is between object 1 and shield 3. This air gap 6 and the shield 3, in combination, provide relatively good thermal and acoustical insulation, but, as can be seen from FIG. 1, the combination of the shield 3, support 4, brackets or clamps 5 and air gap 6 requires considerable space in the automobile, which is not acceptable with modern designs. Furthermore, shields of that nature are time consuming to install and expensive.

Figure 2:
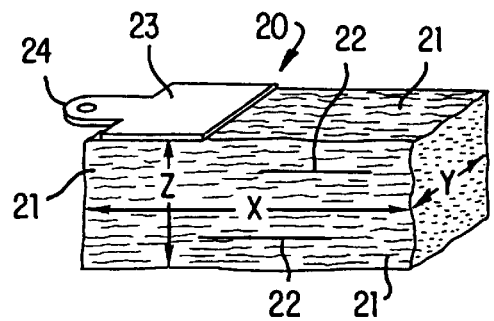
FIG. 2 is a diagrammatic illustration showing another form of prior art shields.

The reason that the prior art required such arrangements, as briefly noted above, is that in prior art shields of the present nature, the Z-directional strength of fibrous insulation batts is not sufficient for the shield to sustain substantial static and dynamic loadings as would be incurred in a modern automobile. FIG. 2 illustrates a prior art fibrous insulation batt material, typically made of glass fibers. In FIG. 2, the batt, generally, 20 has a number of glass fibers 21 disposed generally in the X, Y directions. While those glass fibers 21 can be significantly interlocked in the X, Y directions, by virtue of the method by which glass batts are made, i.e. air laying of glass fibers, those fibers are not significantly interlocked in the Z direction. Therefore, those batts have very little tensile strength in the Z direction, and the batts 20 can easily separate at various planes 22 in the Z direction. Thus, for example, if the batt has a covering 23 (shown in part in FIG. 2) for suspending the batt 20 via an attachment 24, the Z-directional strength is not sufficient to prevent the batt from separating, e.g. at planes 22, under prolonged static and dynamic loading as might be occasioned, for example, in an automobile.

Figure 3:
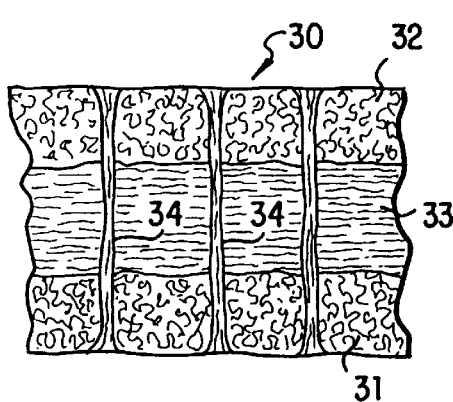
FIG. 3 is a diagrammatic illustration showing prior art needling of an inorganic fiber layer sandwiched between inorganic fiber layers.

As also briefly described above, U.S. Pat. No. 4,522,876 to Hiers discloses a means of substantially increasing the Z-directional strength of inorganic fiber batts, e.g. glass fiber batts, and FIG. 3 is illustrative thereof. In that figure, the batt, generally, 30 has layers 31 and 32 of organic textile fibers sandwiching a glass fiber layer 33. By needle punching, in the manner described in that patent, organic fibers from organic fiber layers 31 and 32 are formed into stitches 34 which proceed from one of the organic fiber layers 31 and 32, through the glass fiber batt 33 and into the opposite organic fiber layer 31, 32. By using the needling technique disclosed in that patent, a large number of such stitches 34 can be utilized in needling that composite batt so as to provide very high Z-directional strength. Those Z-directional strengths are acceptable for many applications, but where very high Z-directional strengths are required, such as in shields for automobiles, separation of the batt in the Z direction can occur, especially under the conditions of long-term repetitive high static or dynamic loading.

Figure 4:
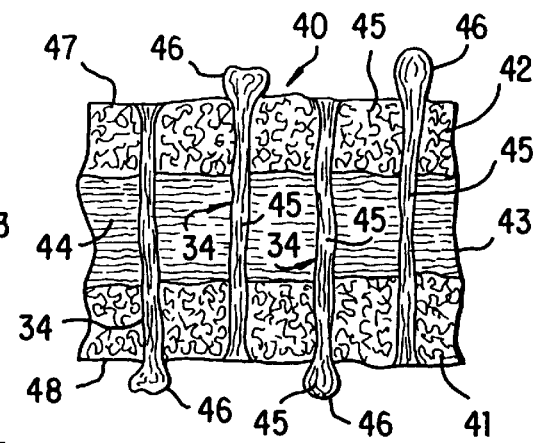
FIG. 4 is a diagrammatic illustration showing the tufted surfaces of the present invention.

The present invention provides a needled batt similar to that of the Hiers patent, but where the needling has been modified to provide tufts on opposite surfaces of the needled batt. As shown in FIG. 4, the present batt, generally, 40 also has organic fiber layers which function, in the present invention, as binding layers 41 and 42. An insulating layer 43 of insulating fibers 44 is disposed between opposite binding layers 41 and 42 of binding fibers 45. In the present invention, binding fibers 45 of each binding layer are needledly disposed through the insulating layer 43 and an opposite binding layer 41, 42 to provide tufts 46 of binding fibers 45 protruding from the opposite binding layer so as to form a tufted upper surface 47 and a tufted lower surface 48 of batt 40. In this regard, and as used in this specification and claims, the terms upper and lower are intended only as identifier designations and are not intended to indicate direction.

The tufts 46 on opposite surfaces, i.e. upper surface 47 and lower surface 48, lock the binding fibers 45 (in the form of stitches, generally 34) such that those stitches 34 cannot pull through the composite upon high static or dynamic loading in the Z direction of the batt 40. The presence of these tufts 46 greatly increases the Z-directional strength of the so-needled batt, but the needling still leaves the batt very flexible, so that the batt can be easily bent to desired configurations.

Figure 5:
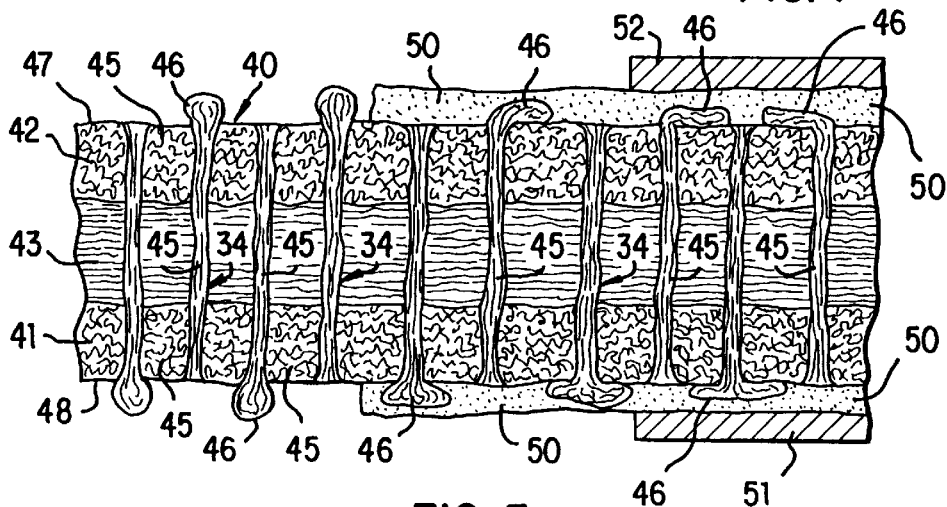
FIG. 5 is a diagrammatic illustration showing the tufts, adhesive and foils assembled to form the present shield.

While the tufts 46 provide very high Z-directional strength, in the present invention, that Z-directional strength is further increased, as shown in FIG. 5. In that figure, a flexible adhesive 50 is disposed and adhered substantially over the upper surface 47 and lower surface 48 (shown only partially disposed in FIG. 5 for clarity). The application of the adhesive 50 causes the tufts 46 to be somewhat deformed or bent from the plane of surfaces 47 and 48 of batt 40 such that the tufts 46 on the upper and lower surfaces 47, 48 are secured to the surfaces 47, 48 by the adhesive 50. That distortion of tufts 46 greatly increases the resistance of the binding fibers 45 from pulling from the opposite surface and therefore causing a failure (separation) of the batt in the Z direction. In addition, once the adhesive 50 is set, that adhesive adheres the tufts 46 to the respective surfaces 47, 48, and this further increases the Z-directional strength of the batt 40.

However, with the present invention, that Z-directional strength is even further increased, as also shown in FIG. 5. A flexible, protective foil 51 (only partially shown in FIG. 5 for clarity) is permanently adhered by the adhesive 50 to the lower surface 48 of the batt 40, and in the application of that foil 51, tufts 46 are further distorted, e.g. flattened, bent, splayed, bradded, and the like, so as to further increase the resistance of binding fibers 45 of stitches 34 from pulling through the batt 40 upon high static or dynamic loading.

Preferably, but not required, a flexible, strippable foil 52 (only partially shown in FIG. 5 for clarity) is releasably adhered by adhesive 50 to the upper surface 47 of batt 40. Thus, similar to the effect of protective foil 51, the application of strippable foil 52, likewise, distorts tufts 46 and further locks and secures those tufts to upper surface 47.

However, a strippable foil is not required, especially for the reasons explained below. When a pressure-sensitive adhesive is used, however, it is necessary to protect the pressure-sensitive adhesive from inadvertently sticking to some object during shipping and handling of the shields. This can be done, however, simply by inserting a release foil between stacked shields, as shown in FIG. 6A, where a stack, generally, 60 of the shields 61 has a release foil 62 between shields 61 and over the upper surface 47 of batt 40 with a pressure-sensitive adhesive 50 thereof (see FIG. 5). Thus, such a stack 60 can be shipped and handled. From the stack 60, individual shields 61 can, therefore, be serially removed for application to a series of objects to be protected, e.g. a series of automobiles in a production line.

When a shield 61 is removed from the stack, the upper surface 47 has the pressure-sensitive adhesive 50 exposed and when that upper surface is pressed onto an object to be protected, as explained in more detail below, the tufts 46 will be further distorted, in the same manner as described above in connection with application of the protective foil 51 to the adhesive. Accordingly, the same results of the in-place shield will follow when a release foil is used between shields in a stack of shields as occurs when a strippable foil is used. However, care must be taken to ensure that the stack remains in place to protect the pressure-sensitive adhesive 50 on the upper surface 47. In addition, a preforming operation, as described below, would be difficult to perform with only a release foil. For this reason, the strippable foil is preferred. The release foil may be made of the same material as the strippable foil, as discussed below.

Figure 6B:
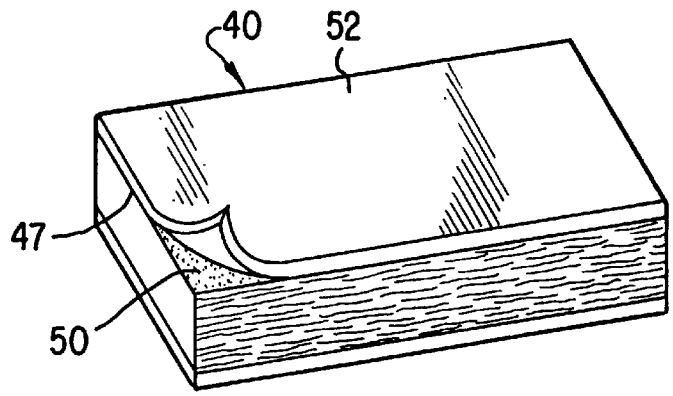
FIG. 6B is a diagrammatic illustration of a preferred embodiment of the invention where a strippable foil protects adhesive on an upper surface of the shield.
Figure 6A:
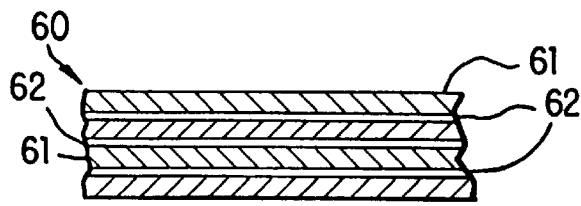
FIG. 6A is a diagrammatic illustration of a stack of shields of the invention, separated by release foils.

The preferred shield, thus, as shown in FIG. 6B, has a strippable foil 52 releasably adhered by a pressure-sensitive adhesive 50 to the upper surface 47 of batt 40 such that, by removal of strippable foil 52, as indicated in FIG. 6B, the shield may be flexed and pressed to configure and permanently attach the upper surface 47 to an object 1 to be shielded.

Figure 6C:
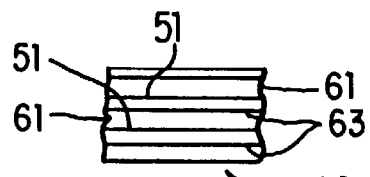
FIG. 6C is a diagrammatic illustration of a stack of the present shields.

Instead of release foil between shields of a stack of shields, the lowermost surface of protective foil 51 can be coated with a release coating so that stacked shields can be handled and then separated. This embodiment is shown in FIG. 6C, where each shield 61 has a coating 63 of a release material on the lowermost surface of protective foil 51.

The batt 40 may be of various thicknesses, depending upon the degree of thermal and acoustical insulation required, the particular binding fibers 45 of binding layers 41, 42 and the particular insulating fibers 44 of insulating layer 43. However, generally speaking, the batt will have a thickness of between about 0.1 to 2.0 inches. Similarly, depending upon the fibers and application, the weight ratio of the insulating layer 43 to each binding layer 41, 42 can vary considerably, but, generally speaking, that ratio will be between about 0.5 and 12.0:1. The weight of each of the binding layers 41, 42 can be different, depending upon the application, but usually, for most applications, the weight of each binding layer is substantially the same.

The insulating fibers preferably will be any of the usual inorganic fibers, such as glass fibers, mineral fibers, alumina fibers and the like, but, more usually, the insulating fibers are glass fibers. However, where the requirement for thermal insulation is lower and the requirement for acoustical insulation is higher, the insulating fibers need not be inorganic fibers and may be, at least in part, organic fibers, such as polyester fibers, nylon fibers and the like. Those fibers may be solid or hollow, the latter of which provides a greater thermal insulation.

The binding fibers are normally organic fibers, such as polyester fibers, nylon fibers, olefin fibers, and cellulose acetate fibers.

The denier of the insulating fibers can vary considerably, but, generally speaking, deniers from about 0.1 to 25 are acceptable in most applications. Likewise, the denier of the binding fibers, e.g. organic fibers, can vary widely, but more usually that denier will be between about 2 and 7.

The fiber length of the insulating fibers can be from very short lengths, e.g. 50 microns, up to fairly long lengths, e.g. 5 inches. Fiber lengths of the binding fibers will normally be between about 0.2 and 8.0 inch.

The needle density in preparing the present batts can vary widely, depending upon the Z-directional tensile strength required for the anticipated static or dynamic loading on the shield. However, the needledly disposed binding fibers 45, as shown in FIG. 5, will generally have a needling density of between about 500 and 10,000 needle punches per square inch of the batt 40. Thus, there are, likewise, between about 500 and 10,000 tufts 46 per square inch on the upper surface 47 and the lower surface 48. However, more usually, there will be between about 700 and 5,000 tufts 46 per square inch on the upper surface 47 and the lower surface 48.

The increased strength of the needled batt, especially in the Z-direction, is generally proportional to the number and size of the tufts. Aside from the number of tufts, as described above, the tufts should have a size such that the increase in strength of the batt in the Z-direction is at least 50% per 1,000 tufts per square inch, and more preferably about at least 100% per 1,000 tufts per square inch, as opposed to the same batt material but untufted. The increase can, however, be much higher.

The adhesive can be any desired known adhesive, but preferably the adhesive is an activatable adhesive, such as an adhesive activated by heat, a solvent or pressure, e.g. a conventional polyester adhesive. Thus, the adhesive may be activated by heating with a hot air gun or an I.R. heater or hot roll or activated by spraying or brushing a solvent thereonto or activated by pressure (pressure-sensitive adhesive), all of which are well known in the art. The preferred adhesive, however, is a pressure-sensitive adhesive. The adhesive may be applied to the batt by spraying, coating or a "transfer tape" (a film of adhesive on a release foil or paper).

The pressure-sensitive adhesive of the preferred embodiment may be chosen from a wide variety of known pressure-sensitive adhesives, but a preferred pressure-sensitive adhesive is the commercial acrylate adhesive, and particularly methacrylate adhesive and ethyacrylate adhesive.

The protective foil 51 can be of a variety of materials, e.g. plastics, metals, fabrics (woven and nonwoven) and the like, but it is preferable that the protective foil 51 be either a metal foil, especially aluminum foil, or a plastic foil, especially a polyester plastic foil. More preferably, the foil will have a heat-reflecting color, either naturally or as a pigment in the foil or as a coating on the foil. For example, where the foil is made of aluminum, the aluminum, per se, has a heat-reflective color. On the other hand, where the foil is a plastic foil, such as polyester foil, that polyester foil can be coated with aluminum to provide a heat-reflective color. The thickness of the protective foil can vary considerably, but generally the thickness of the foil will be between about 2 mils and 100 mils, although thicknesses will more generally be between about 10 mils and 50 mils.

Somewhat similarly, the strippable foil 52 or the release foil 62 may be a metal or a plastic or a textile or a paper, but it is preferred that the foil is a conventional paper foil. The strippable foil or release foil should have a conventional release coating, e.g. a polyolefin coating, on a side thereof which contacts the adhesive, e.g. pressure-sensitive adhesive, so that the foil may be easily removed from the shield to expose the adhesive for adhering the shield to a surface to be protected. The foil can be of any desired thickness, but generally that thickness will be between about 1 mil and 50 mils.

Figure 7:
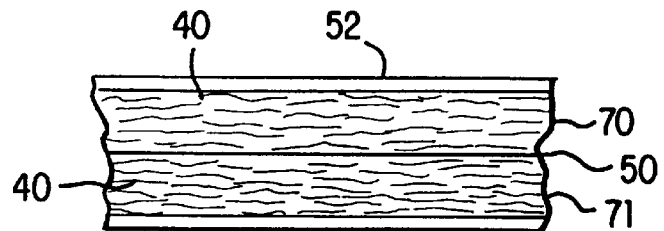
FIG. 7 is a diagrammatic illustration of another embodiment of the invention.

The present shield may also be in the forms of layers of shields, such as shown in FIG. 7, where the shield has two layers 70 and 71 of batts 40 adhered together by adhesive 50 and having the protective foil 51 and the strippable foil 52 (or release foil 62). Of course, more than two layers could be used.

Figure 8:
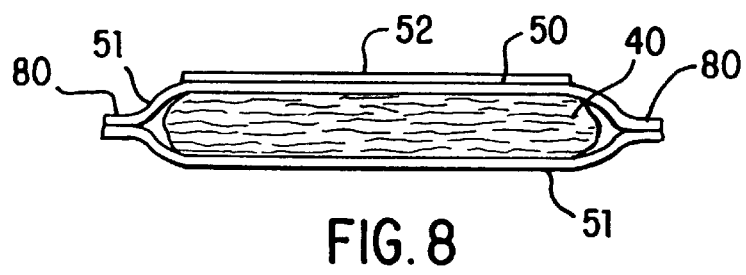
FIG. 8 is a diagrammatic illustration of a further embodiment of the invention.

The shield may be closed at its peripheries, as shown in FIG. 8, where the batt 40 is enclosed within protective foil 51 by sealing the periphery 80 of the protective foil 51 and then placing the pressure-sensitive adhesive 50 and strippable foil 52 on top thereof.

Figure 9:
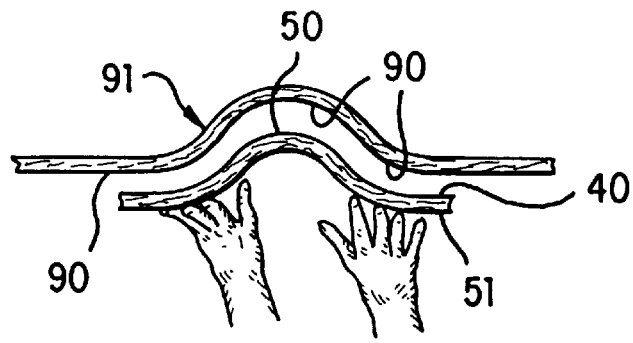
FIG. 9 is a diagrammatic illustration of the application of the present shield to an object to be protected.

The shield, as described above, may be applied to an object for thermally and acoustically protecting that object. As shown in FIG. 6B, by removing the strippable foil 52 from the upper surface 47 of the batt 40 (or removing a shield from stack 60, as shown in FIG. 6C), the pressure-sensitive adhesive 50 thereon is exposed. As shown in FIG. 9, by pressing the batt 40 at the protective foil 51 sufficiently to configure the shield to contours 90 of the object, generally, 91 to be protected, this causes the pressure-sensitive adhesive 50 to permanently adhere to the contours 90. Preferably, the pressing at the protective foil 51 is a manual pressing, as shown in FIG. 9. However, if preferred, prior to removing the strippable foil 52, the shield may be subjected to a preforming step to conform the shield to the general contours 90 of the object 91. This will allow less manual forming of the shield to the contours 91 where the contours are quite complex in configuration.

Figure 10:
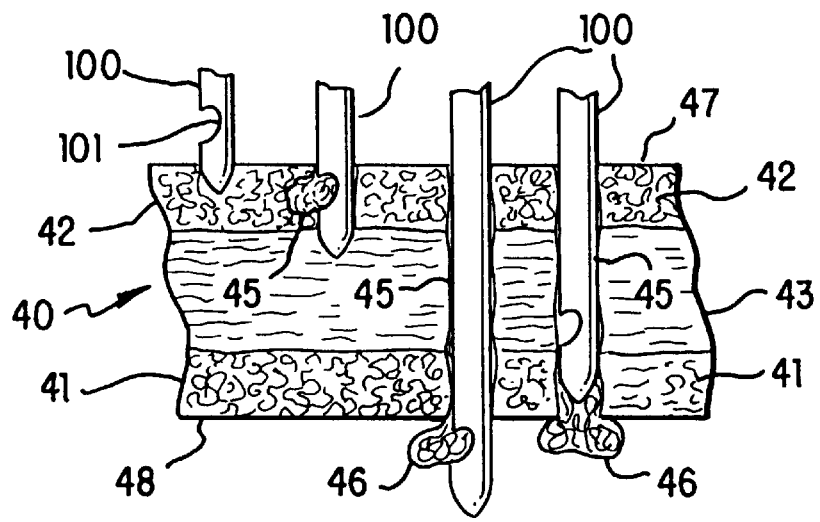
FIG. 10 is a diagrammatic illustration of the needling technique used to produce the present shield.

The needling used in the present invention is illustrated in FIG. 10. As a needle 100 having a barb 101 begins to penetrate binding layer 42, the barb 101 picks up and is essentially loaded with binding fibers 45 in that barb. The needle then passes though insulating layer 43 without picking up substantial insulating fibers since the barb is essentially loaded. The needle then passes through the opposite binding layer 41 such that the barb penetrates below the lower surface 48 and presents a tuft 46 beyond that lower surface 48. As the needle 100 is withdrawn back through binding layer 41, that tuft 46 remains at the lower surface 48. Of course, during that needling operation, as is common with barbed needles, binding fibers 45 will also be pulled with the needles to form stitches 34 of those binding fibers, as shown in FIG. 5. Thus, with the retraction of the needle 100, the tufts 46 which terminate the stitches 34 of fibers 45 remain on the surface. By using conventional needling machines, where needling is conducted from both sides of batt 40, tufts will be disposed on both the upper surface 47 and the lower surface 48, as shown in FIG. 5.

To achieve the tufted surfaces, at least the lowermost barb of any needle should pass through lower surface 48 or upper surface 47, depending upon the needle direction, sufficiently such that the tufted fibers remain on the respective surface when the needle 100 is withdrawn from the batt 40. Generally speaking, that lowermost barb should penetrate beyond surface 48 (or surface 47) by at least about 1/16 inch, more preferably at least about 1/8 inch, e.g. about 1/3 inch, and even up to as much as 1/2 inch or 3/4 inch. This will ensure that a substantial tuft is placed on the surface with each needle punch.

Figure 11:
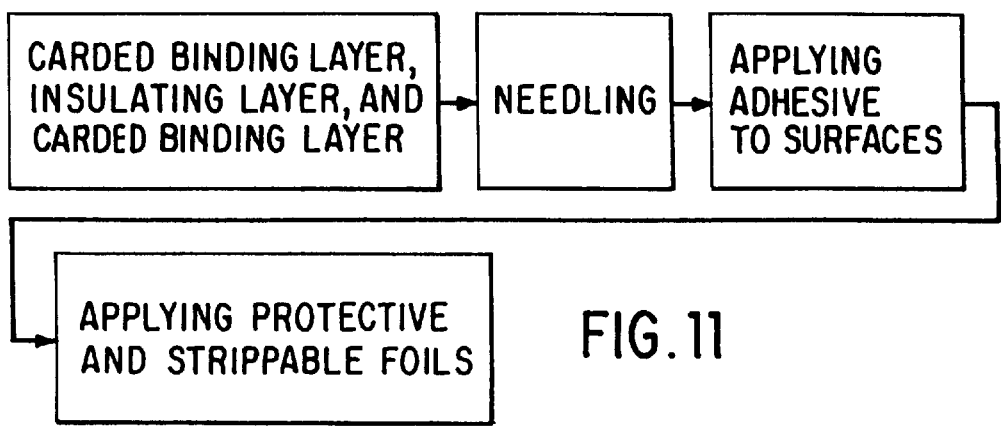
FIG. 11 is a block diagram of the process for making the present shield.

The overall process of producing the present shield is shown in FIG. 11. To produce the present shield, a flexible fibrous batt of an insulating layer of insulating fibers is disposed between opposite carded binding layers of binding fibers, i.e. formed by carding a binding layer, then placing an insulating layer thereover, either preformed or by carding, and then carding a binding layer thereover, all in the conventional manner. Thereafter, the batt is needled in the manner described in connection with FIG. 10 such that the binding fibers 45 of each binding layer 41, 42 are needled through the insulating layer 43 and opposite binding layer 41, 42 to provide tufts 46 of binding fibers 45 protruding from the opposite binding layer 41, 42 so as to form a tufted upper surface 47 and a tufted lower surface 48 of batt 40. The adhesive 50 is applied over substantially the upper surface 47 and the lower surface 48 of batt 40 such that the tufts 46 on the upper surface 47 and lower surface 48 are secured to surfaces 47, 48 by the adhesive 50. A flexible, protective foil 51 is applied and permanently adhered by the adhesive 50 to the lower surface 48 of the batt 40, and, preferably, a flexible, strippable foil 52 is applied and releasably adhered by the adhesive 50 to the upper surface 47 of the batt 40.

Thus, the shield may be flexed and pressed to configure and permanently attach the upper surface 47 to the object to be shielded 91.

The invention will now be illustrated by the following example, where all percentages are by weight, unless indicated otherwise, as is also the case of the specification.

EXAMPLE

A first web of 3 denier, 3 inches staple length polyester fibers was carded onto a moving conveyor belt with the web having a weight of about 2 ounces per square yard. A preformed glass batt (Owens Corning SR-26 range glass) 1 inch thick and 1 lb./cu. ft. density was unrolled onto the moving conveyor and placed on top of the carded web of polyester fibers. A second web of polyester fibers, which was the same as the first web, was carded onto the moving conveyor and on top to the glass batt, so as to form a sandwich of the glass fiber batt between the two carded polyester fiber webs.

The sandwich was passed from the conveyor to a conventional double-acting needle loom (Shoou Shyng Model SDP250112-2) fitted with conventional needles (Groz Beckert 15-18-36-3, style F 333). The sandwich was needled in the double-acting loom with needle punches of approximately 800 needle punches per square inch, with needle penetrations such that the barbs of the needles extended beyond the opposite surface of the sandwich by about 1/8 to 1/5 inch, so as to place a tuft of polyester fibers on that opposite surface at about all needle punches.

The needle punched sandwich was laminated to aluminum foil (zero temper, 1100 alloy, 0.01 inch thick) using a heat activated polyester adhesive (Turex P-900) and a conventional heated roll laminator (minimum roll temperature 500° F.).

A pressure-sensitive adhesive was applied to the opposite surface of the laminate by applying a "transfer tape" made by Venture Tape (a solid film of acrylic pressure-sensitive adhesive on a release paper—Venture Tape No. 524CW), and pressing the "tape" to adhere the tape to the laminate by passing the product through pressure rolls (about 40 to 60 psi). The so-produced product was then wound into a roll thereof.

From the roll, specifically shaped shields were cut using a die press. A pull tab on the release paper was provided by arranging the cutting die to not cut through to the release paper at a small section.

Samples of shaped shields were tested by removing the release paper and pressing the shields from the aluminum foil side to various configure the shields to various contours and permanently adhere the shields to those contours.

A. Samples of the material which had been needled, but not laminated, as reported above, were prepared by cutting (stamping) approximately 10 inches by 2 inches samples and cutting the samples in a plane parallel to the sample surfaces and mid-point of the thickness of the sample to provide two separated cut sections of the sample, each having a cut length of about 1 inch. One of the cut sections was clamped in one jaw of an Instron machine and the other cut section was clamped in the other jaw of the Instron machine. The jaws were separated by the machine at a cross-head speed of about 10 feet per minute and the average internal bond of the samples was determined to be about 9 Newtons.

B. Similar samples of the material after lamination with the adhesive/aluminum foil and adhesive/release paper, as reported above, were similarly tested. The average internal bond of the samples was determined to be about 31 Newtons.

C. As a comparison, similar samples of a needled material according to U.S. Pat. No. 4,522,876 to Hiers (see FIG. 3) were similarly tested. The internal bond of these samples was between 1.5 and 5 Newtons (average about 3 Newtons).

Thus, it can be seen that the samples of A, above, have a very improved internal bond by virtue of the needled tufts, as opposed to the needling of the Hiers patent (the samples of C, above), and a very high internal bond is achieved when the needled batt is laminated with the protective foil and release paper (the samples of B, above).

It will be appreciated that obvious modifications can be made to the specific embodiments disclosed above, and it is intended that those obvious modifications are embraced by the spirit and scope of the annexed claims. In the claims, the drawing reference numerals are for convenience only and are not limitations of the claims.

What is claimed is:

1. A flexible, adhesively attachable, thermal and acoustical insulating shield, comprising:

(1) a needled, flexible, fibrous batt (40) having an insulating layer (43) of insulating fibers (44) disposed between opposite binding layers (41, 42) of binding fibers (45) with binding fibers (45) of each binding layer (41, 42) being needledly disposed through the insulating layer (43) and an opposite binding layer (41, 42) to provide tufts (46) of binding fibers (45) protruding from the opposite binding layer (41, 42) so as to form a tufted upper surface (47) and a tufted lower surface (48) of the batt (40);

(2) a flexible adhesive (50), disposed and adhered substantially over the upper surface (47) and lower surface (48) of the batt (40) such that the tufts (46) on the upper and lower surfaces (47, 48) are secured to the surfaces by the adhesive; and (3) a flexible, protective foil (51) permanently adhered by the adhesive (50) to the lower surface (48) of the batt; and wherein the shield may be flexed and pressed to configure and permanently attach the upper surface (47) to an object (1) to be shielded.

2. The shield of claim 1, wherein the adhesive (50) on the upper surface (47) is a pressure-sensitive adhesive and a flexible, strippable foil (52) is releasably adhered by the pressure-sensitive adhesive (50) to the upper surface (47) of the batt (40) such that by removal of the strippable foil (52) the pressure-sensitive adhesive (50) on the upper surface (47) is exposed.

3. The shield of claim 1, wherein the batt has a thickness of between about 0.1 and 3 inches and the weight ratio of insulating layer to each binding layer is about 0.5 to 12.0:1.

4. The shield of claim 3, wherein the weight of each binding layer is substantially the same.

5. The shield of claim 1, wherein the insulating fibers are inorganic fibers.

6. The shield of claim 5, wherein the insulating fibers are glass fibers.

7. The shield of claim 1, wherein the binding fibers are organic fibers.

8. The shield of claim 7, wherein the organic fibers are polyester fibers, nylon fibers, olefin fibers and cellulose acetate fibers.

9. The shield of claim 1, wherein the needledly disposed binding fibers have a needling density of between about 500 and 10,000 needle punches per square inch of the batt and there are between about 500 and 10,000 tufts per square inch of the batt on the upper surface and the lower surface.

10. The shield of claim 9, wherein there are between about 700 and 5,000 tufts per square inch on the upper surface and the lower surface.

11. The shield of claim 1, wherein the adhesive is a pressure-sensitive adhesive containing an acrylate.

12. The shield of claim 11, wherein the acrylate is selected from the group consisting of methacrylate and ethyacrylate.

13. The shield of claim 1, wherein the protective foil has a thickness of between about 2 mils and 100 mils.

14. The shield of claim 13, wherein the thickness is between about 10 mils and 50 mils.

15. The shield of claim 1, wherein the protective foil is a metal foil or a plastic foil.

16. The shield of claim 15, wherein the protective foil is an aluminum foil or a polyester foil.

17. The shield of claim 2, wherein the strippable foil has a thickness of between about 1 mil and 50 mils.

18. The shield of claim 17, wherein the strippable foil has a release coating on a side thereof which contacts the pressure-sensitive adhesive.

19. The shield of claim 18, wherein the strippable foil is a metal foil, plastic foil or paper foil.

20. The shield of claim 19, wherein the strippable foil is a paper foil.

21. A method of applying the shield of claim 1 to an object to be thermally and acoustically protected, comprising:

(1) exposing the adhesive (50) on the upper surface (47); and (2) pressing the batt (40) at the protective foil (51) to configure the shield to contours (90) of the object (91) to be protected and causing the adhesive (50) on the upper surface (47) to permanently adhere to the contours (90).

22. The method of claim 21, wherein a flexible, strippable foil (52) is releasably adhered by the adhesive (50) to the upper surface (47) of the batt (40) such that by removal of the strippable foil (52) the adhesive (50) on the upper surface (47) is exposed.

23. The method of claim 21, wherein the pressing at the protective foil is a manual pressing.

24. The method of claim 23, wherein, prior to step (1), the shield is subjected to a preforming step to conform the shield to general contours of the object.

25. A method for producing a flexible, adhesively-attachable, thermal and acoustical insulating shield, comprising:

(1) forming a flexible, fibrous batt (40) having an insulating layer (43) of insulating fibers (44) disposed between opposite binding layers (41, 42) of binding fibers (45);

(2) needling the batt (40) such that binding fibers (45) of each binding layer (41, 42) are needled through the insulating layer (43) and opposite binding layer (41, 42) to provide tufts (46) of binding fibers (45) protruding from the opposite binding layer (41, 42) so as to form a tufted upper surface (47) and a tufted lower surface (48) of the batt (40);

(3) applying and adhering a flexible, adhesive (50) over substantially the upper surface (47) and lower surface (48) of the batt (40) such that the tufts (46) on the upper and lower surfaces (41, 42) are secured to the surfaces (47, 48) by the adhesive (50); and (4) applying and permanently adhering by the adhesive (50) a flexible, protective foil (51) to the lower surface (48) of the batt (40); and wherein the shield may be flexed and pressed to configure and permanently attach the upper surface (47) to an object (1) to be shielded.

26. The method of claim 25, wherein the adhesive (50) on the upper surface (47) is a pressure-sensitive adhesive and a flexible, strippable foil (52) is releasably adhered by the pressure-sensitive adhesive (50) to the upper surface (47) of the batt (40) such that by removal of the strippable foil (52) the pressure-sensitive adhesive (50) on the upper surface (47) is exposed.

27. The method of claim 25, wherein the needled batt has a thickness of between about 0.1 and 3 inches and the weight ratio of insulating layer to each binding layer is about 0.5 to 12.0:1.

28. The method of claim 27, wherein the weight of each binding layer is substantially the same.

29. The method of claim 25, wherein the insulating fibers are inorganic fibers.

30. The method of claim 29, wherein the insulating fibers are glass fibers.

31. The method of claim 25, wherein the binding fibers are organic fibers.

32. The method of claim 25, wherein the organic fibers are polyester fibers, nylon fibers, olefin fibers and cellulose acetate fibers.

33. The method of claim 25, wherein the needled binding fibers have a needling density of between about 500 and 10,000 needle punches per square inch of the batt and there are between about 500 and 10,000 tufts per square inch of the batt on the upper surface and the lower surface.

34. The method of claim 33, wherein there are between about 700 and 5,000 tufts per square inch on the upper surface and the lower surface.

35. The method of claim 26, wherein the adhesive is a pressure-sensitive adhesive containing an acrylate.

36. The method of claim 35, wherein the acrylate is selected from the group consisting of methacrylate and ethyacrylate.

37. The method of claim 25, wherein the protective foil has a thickness of between about 2 mils and 100 mils.

38. The method of claim 37, wherein the thickness is between about 10 mils and 50 mils.

39. The method of claim 25, wherein the protective foil is a metal foil or a plastic foil.

40. The method of claim 39, wherein the protective foil is an aluminum foil or a polyester foil.

41. The method of claim 26, wherein the strippable foil has a thickness of between about 1 mil and 50 mils.

42. The method of claim 41, wherein the strippable foil has a release coating on a side thereof which contacts the pressure-sensitive adhesive.

43. The method of claim 42, wherein the strippable foil is a metal foil, plastic foil or paper foil.

44. The method of claim 43, wherein the strippable foil is a paper foil.

* * * * *